United States Patent [19]
Norén

[11] Patent Number: 5,453,736
[45] Date of Patent: Sep. 26, 1995

[54] DOOR OPERATING SYSTEM WITH PROGRAMMED CONTROL UNIT

[75] Inventor: Peter Norén, Landskrona, Sweden

[73] Assignee: Besam AB, Landskrona, Sweden

[21] Appl. No.: 393,231

[22] Filed: Feb. 23, 1995

Related U.S. Application Data

[63] Continuation of Ser. No. 63,523, May 18, 1993, abandoned.

[51] Int. Cl.[6] .................................................. G05B 19/02
[52] U.S. Cl. .................... 340/825.22; 340/825.31; 49/31
[58] Field of Search ............ 340/825.22, 825.31; 49/26, 27, 28, 29, 30, 31

[56] References Cited

U.S. PATENT DOCUMENTS

| | | | |
|---|---|---|---|
| 4,604,826 | 8/1986 | Sorber | 49/30 |
| 4,665,395 | 5/1987 | Van Ness | 340/825.31 |

FOREIGN PATENT DOCUMENTS

| | | |
|---|---|---|
| 3515945C2 | 11/1986 | Germany. |
| 04203187 | 7/1992 | Japan. |

OTHER PUBLICATIONS

Instruction Book for Handy Terminal, Nippon Air Brake Co., Ltd. No Date Found.

*Primary Examiner*—Donald J. Yusko
*Assistant Examiner*—Gregg V. Miller
*Attorney, Agent, or Firm*—Brumbaugh, Graves, Donohue & Raymond

[57] ABSTRACT

A microprocessor-based door control unit includes a programmable, non-volatile-memory for storing door operating parameter values. A separate programming unit, arranged for connection to the door control unit, includes a second microprocessor, a keyboard and a display. The parameter values stored in the non-volatile memory can be read by the programming unit, and new values can be stored in the non-volatile memory using the programming unit.

3 Claims, 3 Drawing Sheets

DOOR OPERATING SYSTEM WITH PROGRAMMED CONTROL UNIT

This application is a continuation of application Ser. No. 08/063,523, filed on May 18, 1993 now abandoned.

BACKGROUND OF THE INVENTION

The present invention relates to an apparatus for controlling the operation of an automatic door. In particular, in the field of automatic doors it has been known to provide a control unit which comprises a programmed microprocessor to control the various operations for the opening and closing of the door. By using a microprocessor very sophisticated variation of the door operation can be achieved. In particular, the use of a microprocessor control unit enables programming of the door to achieve various door opening speeds, for example, high-speed door opening over a major portion of the door travel and then low-speed door opening toward the end so that the door does not impact the stop units through inertia. Similar high and low speed regulation of the door can be achieved for the closing operation. Variations can include the distance over which high-speed opening occurs and low-speed opening and/or closing occurs as well as the opening or closing rates for high and low speed. In addition, there can be variations in the amount the door opens. For example, with a sliding door arrangement, it may be desirable to have the door open only partially during periods of relatively low traffic to enable the entry or exit of a single person. This may also be appropriate during times of extreme whether conditions to avoid excess burden on the air conditioning or heating of a building. In some instances security can be enhanced by providing only a small opening, for example, where a pharmacy is dispensing drugs during late hours, the door can only be open far enough to enable packages and money to be exchanged between a customer on the outside and the pharmacist on the inside without opening the door far enough to enable the customer to enter the building.

Other modes of operation can be achieved for example, during the time immediately prior to closing of a shop the door can be arranged to open and allow customers to exit but to not open in response to a customer attempting to enter the building.

Since a microprocessor control unit can provide variation in control of the door operating functions as described, these functions can normally be varied by service personnel accessing the door control unit. A potential problem occurs in the event a serviceman exceeds allowable limits for a door operation, for example setting the speed of door opening too fast for a particular application, for example, a facility frequented by elderly people, wherein the door parameters might exceed the limitations of safety.

Another problem that arises where there is provided a large capability for variation of door opening and closing parameters, is that the parameters might not be set to the correct values, again because of an inexperienced service personnel.

Accordingly, it is desirable to provide a pre-set limited range of door operating conditions, which can be selected and programmed into a microprocessor controlled door opening control unit by selecting only one of a variety of preset operating parameters. In addition, it is desirable to limit the range of values which can be set by the service or installation personnel under normal conditions, and to enable extraordinary values to be set only by more experienced service supervisors or the like.

OBJECT OF THE INVENTION

It is accordingly an object of the present invention to provide a new and improved automatic door control system wherein the programming of the system by service personnel is limited by preset values.

It is a further object to provide a convenient system for programming a door operating control unit.

SUMMARY OF THE INVENTION

In accordance with the invention there is provided an apparatus for the control of the operation of an automatic door. The apparatus includes a door control unit comprising a microprocessor circuit including a door control program stored in a first non-volatile memory. The door control program is responsive to sensor signals supplied to the microprocessor circuit by sensor units. It is also responsive to operating parameter signals stored in a second nonvolatile read/write memory and to command signals provided by a communications interface, for controlling the opening and closing of an automatic door in response to the sensor signals and using door control parameters represented by the parameter signals. The unit is arranged for communicating with a programming unit and storing parameter signals in the second memory in response to the command signals. The apparatus further includes a programming unit arranged to be connected to the communications interface of the control unit for supplying the command signals thereto. The programming unit includes a second microprocessor, a keyboard and a display. The microprocessor of the programming unit includes a control program for generating command signals in response to entries on the keyboard and for displaying parameter values on the display in response to parameter value signals received from the door control unit by the interface unit.

Preferably the door control unit program is responsive to command signals for controlling the opening and closing of the door in response to commands entered by the keyboard when the programming unit is connected to the communications interface. The second microprocessor in the programming unit preferably includes a memory having a set of predetermined parameter values and includes a control program for generating commands to cause parameter values to be transferred as command signals to the control unit. There may be provided a plurality of sets of the predetermined parameter values and the control unit can generate commands to cause a selected set of the parameter values to be transferred. The programming unit microprocessor may include a control program for performing diagnostic tests of the door control unit and the sensors associated therewith.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
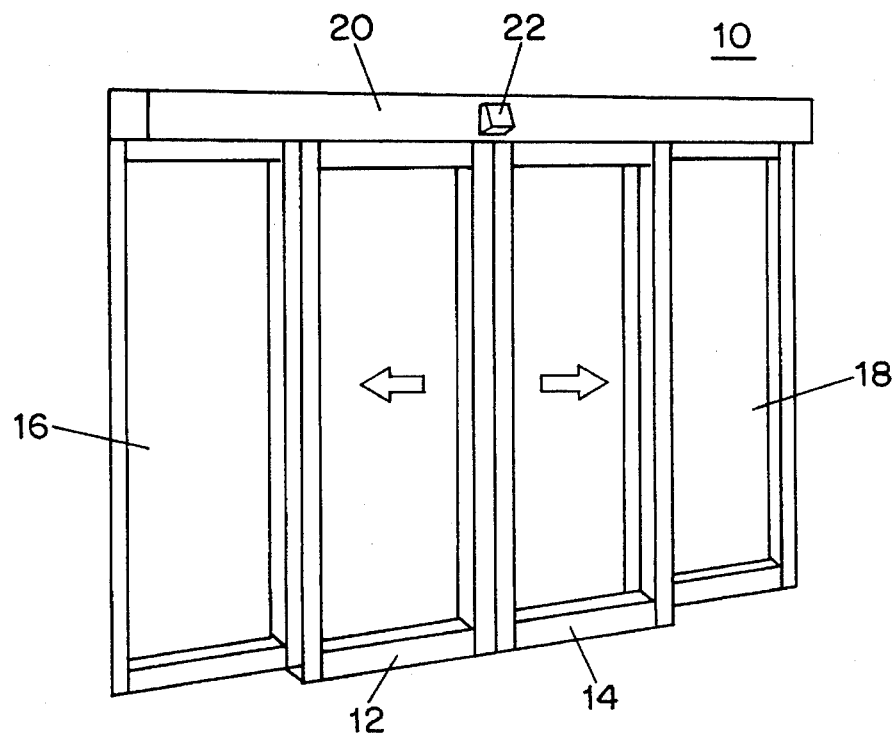
FIG. 1 is an illustration of a sliding automatic door system having the control system in accordance with the present invention.

FIG. 1 shows an automatic, motor-operated sliding door system having a control unit according to the present invention. The FIG. 1 automatic door apparatus 10 includes door leaves 12 and 14 which slide respectively to the left and right under control of a motor arranged within upper unit 20 of the door apparatus 10. As door leaves 12 and 14 open they move adjacent side panels 16 and 18 to allow ingress and egress from a building. Typically, the operation of the automatic door system 10 is controlled by the use of sensors, such as motion detector 22 and a similar unit on the other side which detect the movement of a person approaching the door from either side. In addition to motion sensors, doors of the type shown in FIG. 1 might use additional safety sensors to detect the presence of a person in the path of an open door, and thereby prevent door closing when a person is between the door leaves 12 and 14. Operation of a sliding door using motion detectors is described in U.S. Pat. No. 4,827,264, granted May 2, 1989. One type of additional safety sensor is described in U.S. Pat. No. 4,736,097, granted April 5, 1988.

Figure 2:
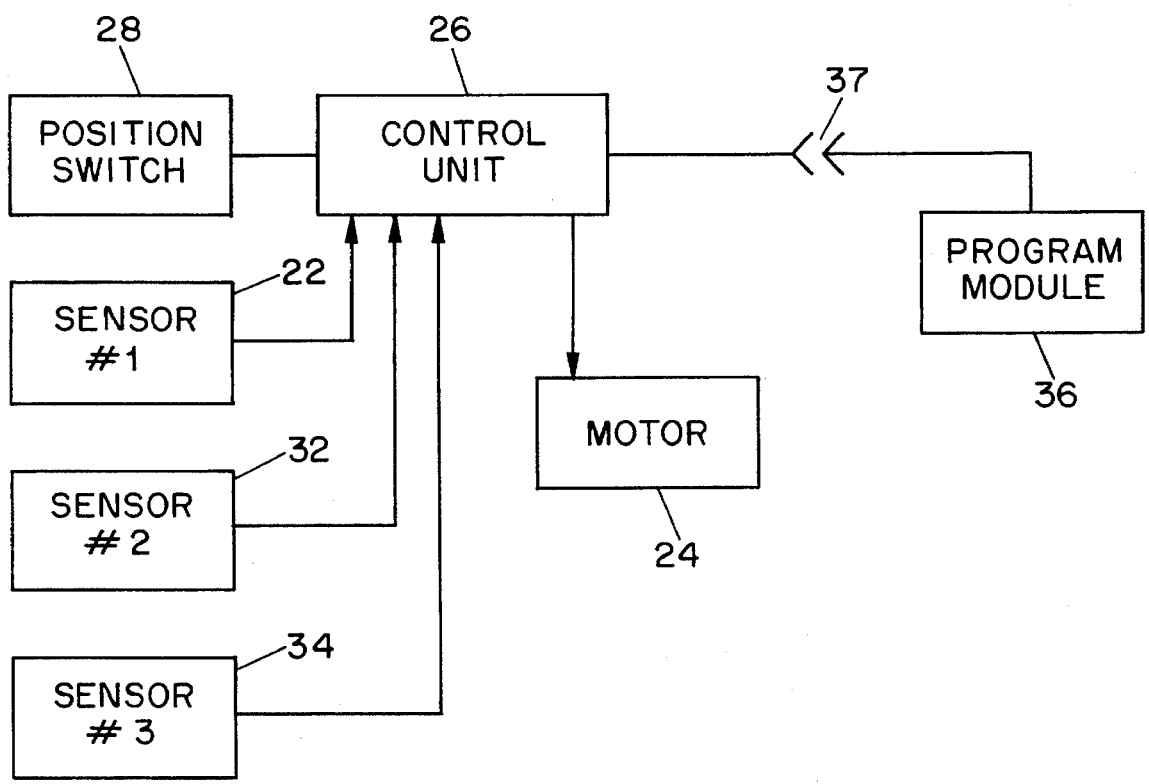
FIG. 2 is a block diagram showing the interconnection of a control unit of the FIG. 1 door system with other automatic door elements and a program module.

FIG. 2 generally illustrates the arrangement for control of the door system 10 of FIG. 1. The header 20 of the door 10 includes a control unit 26 which controls the operation of the door motor 24. The control unit 26 responds to sensors 22, 32, 34, which are connected to provide sensor signals to the control unit indicating the motion of a person toward or away from the door. In the example illustrated in FIG. 2, three sensor units may be provided which include motion detectors on the inside and outside of the door and a sensor to detect the presence of a person who is in the way of the door, such as an active passive photoelectric sensor or sensor of the type described in Pat. No. 4,736,097. In addition, the control unit 26 may respond to a position switch 28, which may be a key-activated switch for moving the door into an open or closed position according to the position switch condition.

According to the invention, there is provided a separate programming module 36, which is arranged for temporary connection to the control unit 26 by connector 37 to enable parameters of operation of the door system to be adjusted as required.

Figure 3:
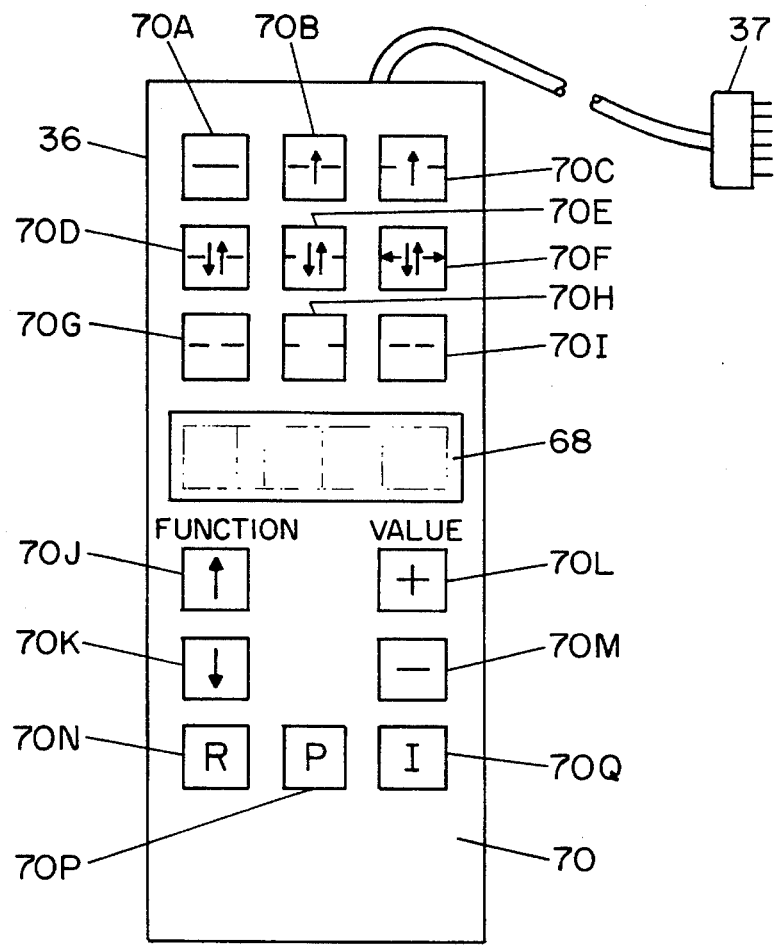
FIG. 3 is an illustration of a program module according the present invention.

Among the parameters which can be adjusted in the door system 10 are the speed for opening of the door during its high-speed phase, the speed for opening or closing of the door during its low-speed phase, the width of door opening and the delay time prior to initiation of door closing in the absence of a safety signal. In FIG. 3 there is shown the exterior of a programming module 36 according to the present invention. The programming module includes a keyboard 70 having control buttons 70A through 70I and parameter buttons 70J through 70Q which will be described in further detail. In addition, it incorporates a display unit 68, which in the illustrated example is a four digit numeric display.

Figure 4:
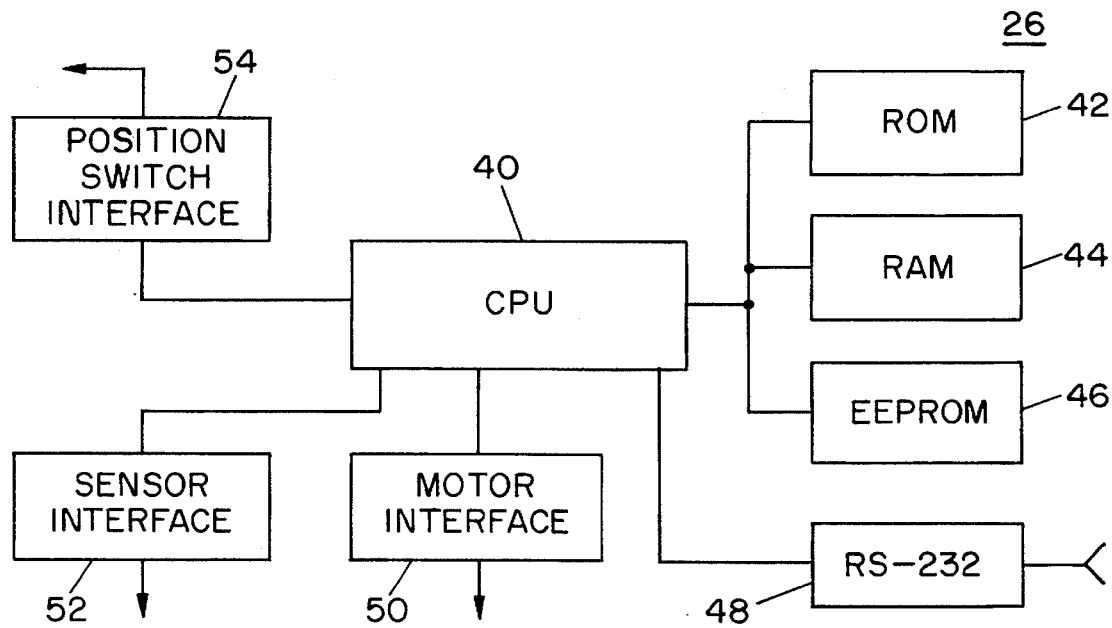
FIG. 4 is a block diagram of door control unit according to the present invention.

FIG. 4 illustrates a typical arrangement for control unit 26 which includes a central processing unit or microprocessor 40, a series of memories 42, 44 and 46, and interfaces for connection to the position switch, the sensors and the door motor. In particular the central processing unit 40 and memories 42, 44, 46 might comprises a single chip microcomputer, or may be arranged on separate integrated circuits, according to the requirements of the individual designer and the memory capacities required. The read-only memory 42 typically includes an overall permanent control program for controlling the operation of the central processing unit 40, for example during normal door operations, and in addition during the programming operations as will be described. A small amount of random access memory 44 may also be provided to temporarily store conditions during operations of the control unit or during programming thereof. An electronically-erasable, programmable read-only-memory 46 is also provided. This memory 46 is a non-volatile memory which is used for the purpose of storing door operating parameters which are used by the control program in memory 42 to set specific operations of the automatic door 10, as will be further described.

Interface 54 connects the central processing unit 40 to an external position switch for manual control of the door as has been described. Sensor interface 52 interconnects the central processing unit to the door sensors which detect the presence or absence of a person as needed for operation of the door. Motor control interface 50 provides signals to the door motor 24 to control its operation including the speed of operation and the door opening width. RS 232 interface 48 is provided to interconnect control unit 26 to the programming module 36. In particular, a standard interface has been selected so that, if desired, it would be possible to reprogram the operation of the door remotely by use of a telephone link or to diagnose problems in the operation of the door by telephone connection.

Figure 5:
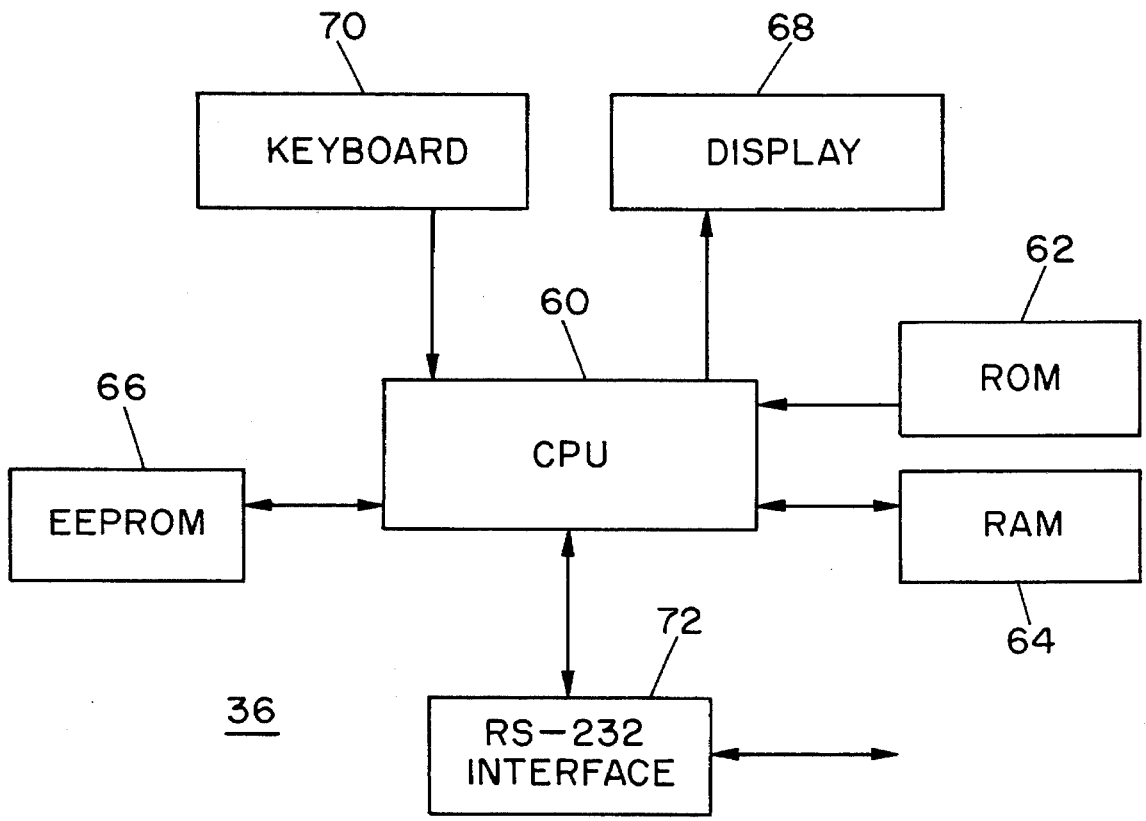
FIG. 5 is a block diagram of a program module according to the present invention.

FIG. 5 is a block diagram showing a preferred arrangement for the programming module 36 of FIG. 3. The programming module additionally includes a central processing unit 60, read only memory 62, random access memory 64 and electronically erasable programmable read-only-memory 66. As with the corresponding units of the door control unit 26, the central processing and associated memories might be included on a single chip computer. In addition, the programming module 36 includes a keyboard 70 and display 68 which are necessarily interfaced to central processing unit 60 by appropriate interface connections which are not shown. An RS 232 interface 72 is also provided for communications to RS 232 interface 48 of door control unit 26.

The programming module 36 of the present invention is useful in connection with the initial installation or adjustment of an automatic door. As previously pointed out, a microprocessor door control unit 26 has various parameters which can be controlled to vary the door operation to suit the particular installation. During door installation, the installer would typically check the operation of the door to see that the operation is suitable to the particular installation, and to see that the operation of the door does not interfere with adjoining structures. The position switches 70A to 70I on the programming module 36 are similar to switches which might be provided on a position switch 28 associated with a door installation. When the programming module 36 is connected to the door control unit, by connector 37, power is supplied to the programming module from the control unit, and function switches 70A through 70I on the program module become a substitute for any position switch which might be connected to the door 10. Switch 70A is an off switch which causes the door to move to a closed position and remain closed. Switch 70B allows the door to operate only in the exit mode and only to a partially opened position. In the exit mode, the sensor on the interior side of the door is operative to partially open the door, but the sensor on the exterior side of the door is not operative to open the door. Thus, the door functions for exit-only. Switch 70C causes the door to operate similarly for exit only but moves the door to the fully opened position. Switch 70D causes the door to operate automatically from either side, but only open to the partially-opened position. Switch 70E allows automatic opening of the door to the full opened position from either side. Switch 70F causes the door to automatically select either partially-opened condition or fully-opened condition, according to the volume of traffic moving through the door. Switch 70G causes the door to open to the partial position and remain there. Switch 70H causes the door to open the full position, and remain there. Switch 70I causes the door to open to what is called the "pharmacy" position, that is an opening of only 5 to 20 centimeters, to enable dispensing of packages without entry or exit of a person.

The switches on the lower half of the programming module 36 are used in connection with the programming of the functions of the control unit 26. Set forth in table 1 below is a listing of appropriate functions that may be included in the control unit and provided by the programming unit. The buttons 70J, 70K, 70L and 70M are used in connection with the corresponding digit elements of the LED display 68. By pressing button 70J the function numbers in the first two digits of display 68 are changed from 01 through 99. The functions corresponding to the function numbers in the preferred embodiment are listed in the following table along with the allowable range of function values or condition, i.e. A/b.

| MD/FUNCTIONS AND VALUES | | |
|---|---|---|
| Function | Name | Value (approx.) |
| 01 | High speed opening | 20–70 cm/s |
| 02 | Low speed opening | 05–15 cm/s |
| 03 | Low speed distance opening | 00–30 cm |
| 04 | High speed closing | 15–70 cm/s |
| 05 | Low speed closing | 05–15 cm/s |
| 06 | Low speed distance closing | 00–30 cm |
| 07 | Hold open time | 00–60 s |
| 08 | Hold open time with key impulse | 00–60 s |
| 09 | Photocell type, make/break impulse | A/b(make/break) |
| 10 | Eye-CueT ™ monitoring | A/b(eye-cue, no/yes) |
| 11 | Emergency opening/Emergency closing (EUD) | A/b(open/close) |
| 12 | Electronic/Mechanical emergency unit | A/b (elect./mech.) |
| 13 | Monitoring of the emergency unit | A/b(no/yes) |
| 14 | Emergency function with the position switch, PS-/PSP, in "Off" | A/b(no/yes) |
| 15 | Partial opening width | 03–20 dm |
| 16 | Hold open time for partial opening | 00–60 s |
| 17 | "Auto width" hold open time | 00–60 s |
| 18 | Impulse time from "Auto width" to full opening | 00–60 s |
| 19 | Resume time for "Auto width" after closing, from full opening | 00–60 s |
| 20 | Pharmacy opening width | 00–20 cm |
| 21 | Pharmacy hold open time | 00–60 s |
| 22 | Electromechanical lock, without/with power | A/b (without/with) |
| 23 | Hold force on closed door | 00–20 N |
| 24 | Repeated emergency closing | A/b(no/yes) |
| 25 | Interlocking/Synchronizing, between two doors | A/b(interl./synchr.) |
| 26 | Eye-Cue, C-switch distance | 00–50 cm |
| 27 | Motor direction | A/b |
| 98 | Pre-set parameters/01 = Light door, 02 = Normal door, 03 = Heavy door | 01–03 |
| 99 | System tests | 01–09 |

When a particular function is selected, such as hold open time function 07, the left two digits of the display indicate the function number and the right two digits of the display panel 68 will indicate the value which has been programmed into the door. The value would be for example 00 to 60 seconds. By pressing buttons 70L or 70M, the value of that particular function may be adjusted, for example if the value programmed into the control unit 26 was originally 20 seconds by pressing button 70L (t) the value could be adjusted to 30 seconds. This value will be transmitted and set into the control unit 26 by pressing the program button 70P. The reset button 70N can be used to reset the control unit 26 and the programming module. This will cause the door control unit 26 to go to its initial adjusted condition.

In a preferred embodiment, the programming module 36 may include a set of preprogrammed parameters appropriate for normal door installations. As indicated, these parameters can be accessed by programming function 98. The value can then be set to 01 corresponding to a light door, 02 corresponding to a normal weight door or 03 corresponding to a heavy weight door. By pressing button 70P, an appropriate pre-programmed set of parameter values is transferred to the door control unit.

In addition to setting parameters, the programming module may perform system tests to test the functioning of the control unit and its associated sensors. By selecting function 99 and a value corresponding to a particular functional test, i.e. presence of a detection unit, and pressing the button 70P the test selected will be performed. In the event the test indicates a problem with the unit an appropriate error code is displayed.

Error codes may also be displayed by the unit upon initial connection of the programming module to the control unit, which will indicate a problem with the control unit and its associated sensors, such as a defective sensor unit or improper installation of the sensors to the control unit or other equipment problems.

According to the present invention, another feature available in the programming module is provided by the EEPROM 66 to enable the installer to transfer the functional parameter sendings from one door to another door which requires a similar installation. In connection with the use of this function on the programming module, when a door installation has been set up and proper parameters have been achieved, the installer can select function 98, value 05 which will cause the program parameters previously stored in the door control unit 26, and adjusted as desired, to be transferred to the nonvolatile memory 66 on the program module 36. The programming module can then be connected to another door and by selecting function 98 value 04 the values previously read from the first door will be transferred into the control unit for a second door.

The operation of the unit will now be described. In connection with a typical installation. After assembly of the door the sensors, the control unit 26 and the operating motor, the installer connects the programming module to the door. Using the programming module, the installer can check the width and speed of door opening and other parameters. A relatively quick programming can be achieved by selecting function 98 and a value 01, 02 or 03 according to the weight of the door. By pressing the program key, preset parameter values will be programmed into the door. By using the control keys on the upper part of the programming module the installer can then check the operation of the door under a variety of door operating conditions. He will observe whether the door is functioning satisfactorily in each of these conditions and can then make individual adjustments for the particular door installation. For example, the installer may adjust the distance that the door opens or closes at low-speed as compared to the opening or closing distance at high speed. The installer can also adjust the speed of opening or closing of the door at both the high speed and low speed settings. When he has achieved satisfactory operation of the door for a particular installation, he may read the values programmed into the door control unit 26 to the non-volatile memory of the program module 36 and use the same set of values for another door in a similar installation, for example wherein there are double doors with similar surroundings.

One important feature of the programming module according to the present invention is that by setting the program of the programming module in read-only memory 42 it is possible to limit the range of values that a particular installer can set into an automatic door. For example, the distance of low-speed opening of the door may be set so that it cannot be set by an installer below a certain fixed value. Also, the speed of closing of the door may be set to within a limited range of values so that a door installer does not set a door for operation at too high a speed which may be hazardous or frightening to door users. By presetting the range of values available in a particular programming module using firmware, it is possible to have programming modules with different levels of authority, for example, a service personnel supervisor may have a programming module that allows a wider setting of program parameters than those allowed to the ordinary installation personnel. A factory representative may have an even higher range of values available to him for selection.

A major advantage of the programming module according to the present invention is a relatively controlled ability to adjust the operation of an automatic door. For example, a store owner who wishes to prevent loss of the heat in his store, who may be tempted to set a door hold-open time to a dangerously low value, would not be able to do so without the use of a programming module. The programming module would only be in the possession of authorized service personnel, and even the range of values to which they are permitted to set the door parameters can be limited according to the capability and experience of the service personnel involved. In addition, greater security of the safety feature can be achieved by having each programming module de-activate itself if its program is not periodically renewed at the factory, thereby preventing extended use of a lost or stolen programming module by untrained personnel.

A further possibility is to program the door control unit to record the identity of the last programming module which has been connected. In the event of an accident, unauthorized tampering with the unit can then be detected.

While there has been described what is believed to be the preferred embodiment of the present invention, those skilled in the art will recognize that other and further variations may be had therein without departing from the spirit of the invention, and it is intended to claim all such changes as fall within the true scope of the invention. In particular, a programming module similar to that described herein but having different variables might be used for control of a swing automatic door and the variables associated with its operation.

I claim:

1. Apparatus for the control of the operation of an automatic door, comprising:

a door control unit comprising a microcomputer circuit including a door control program stored in a first non-volatile memory and responsive to sensor signals supplied thereto by sensor units and operating parameter values stored in a second non-volatile, read/write memory for controlling the opening and closing of an automatic door in response to said sensor signals and using door control parameters represented by said operating parameter values; said micro-computer circuit further including a communications interface and said control program further including instructions for communicating with a programming unit for receiving command signals therefrom and for storing parameter values in said second memory in response to said command signals and program instructions for generating parameter value signals representative of said stored parameter values and supplying said parameter value signals to said communication interface; and a programming unit arranged to be connected to said communications interface of said control unit for supplying said command signals thereto, said programming unit including a second microcomputer, a keyboard and a display, said second microcomputer including a second control program for generating said command signals in response to entries on said keyboard and for displaying parameter values on said display in response to parameter value signals received from said door control unit via said communications interface unit, said command signals representing operating parameter values to be stored in said non-volatile read/write memory in said door control unit, said second control program limiting the range of said parameter values according to a level of authority represented by said second control program.

2. Apparatus as specified in claim 1 wherein said door control program includes instructions for receiving identification signals with said command signals and for storing said identification signals in said second memory and program instructions for supplying said stored identification signals to said communications interface and wherein said second control program in said programming unit generates said identification signals to identify said programming unit and supplies said identification signals to said communications interface.

3. Apparatus as specified in claim 1 wherein said second control program includes instructions for disabling said program after a predetermined time interval.

* * * * *